Sept. 22, 1942.    W. R. GRISWOLD    2,296,519
MOTOR VEHICLE
Filed Dec. 6, 1940
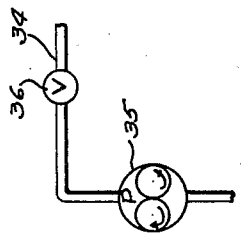
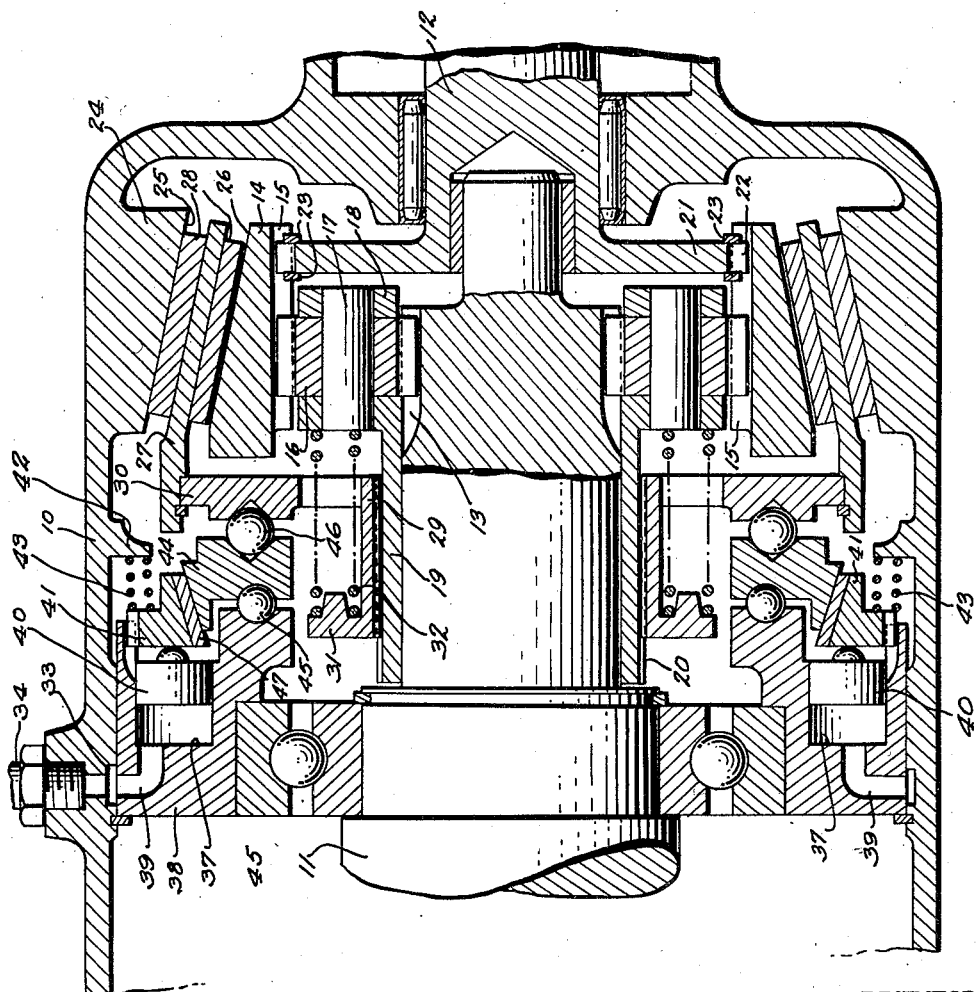
INVENTOR.
Walter R. Griswold
BY
Tibbetts & Hart
Attys.

Patented Sept. 22, 1942

2,296,519

UNITED STATES PATENT OFFICE 2,296,519

MOTOR VEHICLE

Walter R. Griswold, Detroit, Mich., assignor to Packard Motor Car Company, Detroit, Mich., a corporation of Michigan Application December 6, 1940, Serial No. 368,812

10 Claims. (Cl. 74—298)

This invention relates to drive mechanism and more particularly to control mechanism for selectively providing a forward drive or a reverse drive.

In one form of drive mechanism a power shaft and a driven shaft are connected by planetary gearing that is controlled to effect either forward or reverse drive. When the power shaft is driven from a power source, such as a fluid torque converter, without provision for disconnection when shifting between forward and reverse drives, considerable difficulty has heretofore been encountered in effecting the shift due to the tendency of the driving force to maintain the established driving connection.

An object of this invention is to provide a control for drive mechanism, of the character referred to, that can be readily actuated to establish either a forward drive or a reverse drive without disconnecting the source of power.

Another object of the invention is to provide drive mechanism, of the type referred to, with power means under control of a vehicle driver for establishing a forward drive or a reverse drive without disconnecting the source of power.

A further object of the invention is to provide planetary gearing connecting a pair of shafts with a control member that can be shifted automatically to effect either a forward or reverse drive.

Other objects of the invention will appear from the following description taken in connection with the drawing, which forms a part of the specification, and in which:

Fig. 1 is a vertical sectional view through a fragment of drive mechanism having the invention incorporated therein;

Fig. 2 is a diagrammatic fragmentary view of the control for the fluid actuating system.

In the drawing only a portion of drive mechanism is illustrated, the drive mechanism casing 10 carrying the drive shaft 11 and the driven shaft 12. The drive shaft can be connected with a fluid torque converter or some other form of power device (not shown), and the driven shaft 12 can be arranged to transmit power at a suitable point, such as the axle of the motor vehicle (not shown). The shafts 11 and 12 are connected by controlled planetary gearing. In such gearing the sun gear consists of teeth 13 formed on the rear portion of the drive shaft. A ring gear 14, having internal teeth 15, encircles the sun gear and planet pinions 16 are mounted on shafts 17 extending across openings in the carrier 18, such planet pinions being arranged to mesh with the sun gear and the ring gear. The carrier 18 and an extension sleeve 19 having splines 20 are rotatably mounted on the drive shaft. The driven shaft is formed with an end flange 21, having peripheral teeth 22 that are engaged with the teeth 15 of the ring gear, and is held against axial displacement by snap rings 23 seated in suitable grooves in the teeth of the ring gear.

It is proposed to control the planetary gearing by mechanism that can be actuated to provide a reverse drive by holding the carrier with the casing or to provide a direct drive by locking the ring gear with the carrier. The casing is formed with an internal portion such as a flange 24 having a conical inner face 25 and the ring gear 14 is formed with a complementary peripheral conical face 26. The control mechanism consists of a ring member 27 having braking material 28 fixed to opposite faces thereof and such control member is complementary to and extends between the conical faces 25 and 26. This ring member 27 is fixed to a hub member 29 that is slidably splined on the carrier sleeve 19, and such hub member has a pair of radially extending flanges 30 and 31, the flange 30 being suitably secured in fixed relation with the ring member 27.

When the control mechanism is moved to the left so that the inner brake element 28 engages the ring gear 14, the carrier and ring gear will be locked together to establish direct drive between the shafts 11 and 12. A plurality of coil springs 32 engaging flange 31 at one end and the differential carrier at the other end normally establish this direct drive relationship.

The control member is moved rearwardly to engage the outer brake element 28 with the flange 24 of the casing, as shown in the drawing, through the operation of power means acting upon servo mechanism. The power means can be of a fluid pressure type in which the fluid is admitted to an annular recess 33 formed in the interior wall of the casing from the conduit 34 connected with a suitable source of supply. This conduit can be connected with a gear pump as indicated at 35, suitably driven from the engine, and can have therein a control valve as indicated at 36 adapted to be actuated by the driver of a motor vehicle. The recess 33 connects with a plurality of chambers 37 formed in one end of a ring structure 38 through means of ducts 39. The ring structure 38 is suitably fixed to the casing 10 and in a sealed relation therewith so that there will be no leakage of the fluid from conduit 34 or the ducts 39. In the chambers 37 are arranged pistons 40 that engage with a ring brake member 41 slidably splined to the ring structure 38. This brake member can move axially to control servo mechanism. The casing is formed with an abutment 42 adjacent the brake member and between such member and the abutment is arranged a plurality of coil springs 43 that normally urge the brake member out of engagement with the servo mechanism.

The servo mechanism includes a rotatable ring member 44 bearing against balls 45 engaging an inner end face of the ring structure 38, which balls serve as a thrust bearing. The adjacent faces of the ring member 44 and the flange 30 are provided with conical recesses in which are seated servo balls 46. The springs 32 exert a pressure through the hub 29 and its flanges 31 and 30 in a direction sufficient to hold the thrust balls and the servo balls in assembled relation. Ring member 44 has a conical periphery that is adapted to be engaged by brake material 47 fixed to a conical inner surface of the brake member 41. When the fluid pressure is shut off from the chambers 37, the spring 43 exerts sufficient pressure to disengage the brake member 41 from the servo ring member 44. When the fluid pressure is allowed to enter the chambers 37 then the pistons 40 are moved to the right to engage the brake member with the servo ring member and thus hold it stationary. This holding of the servo ring member will cause the servo balls 46 to ride out of centered position in the conical recesses and will thus force the flange 30 and the control ring 27 to the right, to engage the outer brake member 28 with the casing flange 24 and thus prevent rotation of the planetary carrier. Under this condition of operation rotation of the carrier will be stopped and the planetary gearing will function to transmit a reverse drive from shaft 11 to shaft 12.

It will be noted that this control mechanism is shiftable without disengaging the planetary gearing from driving relation between shafts 11 and 12 or cutting off power to drive shaft 11, so that a continuous drive can be shifted back and forth between forward and reverse as desired. Normally springs 32 serve to shift the control hub into a position locking the carrier extension sleeve with the ring gear and this occurs when the fluid pressure valve 36 is turned to closed position. When the fluid pressure valve is turned to open position, the servo mechanism will function to hold the carrier so that reverse drive through the planetary gearing will result. This control of the planetary gearing is compact and will function readily in shifting from one drive to the other with substantially no effort upon the part of the vehicle driver.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. Drive mechanism comprising a power drive shaft, a sun gear fixed to rotate with said drive shaft, a driven shaft, a ring gear fixed to rotate with said driven shaft, a carrier freely mounted on said drive shaft, planet pinions rotatably mounted on said carrier and engaging with said sun and ring gears, a stationary element, an axially shiftable member connected to rotate with said carrier, a spring normally holding said shiftable member in position locking said ring gear and said carrier to rotate in unison, servo mechanism operable in response to torque to shift said member into engagement with said stationary element, and fluid pressure means operable to control said servo mechanism.

2. Drive mechanism comprising a power drive shaft, a driven shaft, planetary gearing drivingly connecting said shafts and including a ring gear and a freely mounted planet pinion carrier, a stationary element, a shiftable member operable to lock said planetary gearing or to hold a portion thereof, a spring exerting pressure on the member to normally lock the planetary gearing, servo mechanism operable to engage said member with said stationary element including a rotatably mounted ring member, a shiftable brake member, means normally disengaging said brake member from said ring member, and fluid pressure actuated means operable to engage said brake member with said ring member.

3. Drive mechanism comprising a power drive shaft, a driven shaft, planetary gearing drivingly connecting said shafts including a ring gear fixed to rotate with the driven shaft and a freely mounted planet carrier, a stationary member, a shiftable control member splined to the carrier, spring means urging said control member into position locking said ring gear and said carrier together, servo mechanism operable to move said control member out of locking relation and into engagement with said stationary member, a brake member engageable with said servo-mechanism, and fluid actuated pistons operable to engage the brake member with said servo mechanism.

4. Drive mechanism comprising a power drive shaft, a driven shaft, planetary gearing drivingly connecting said shafts including a ring gear fixed to rotate with the driven shaft and a freely mounted planet carrier, a stationary member, a shiftable control member splined to the carrier, spring means urging said control member into position locking said ring gear and said carrier together, servo mechanism operable to move said control member out of locking relation and into engagement with said stationary member, a fluid pressure system operable to move said pistons for energizing said servo mechanism, and manually operable means controlling said fluid pressure system.

5. Drive mechanism comprising a power drive shaft, a driven shaft, planetary gearing drivingly connecting said shafts including a ring gear fixed to rotate with the driven shaft and a freely mounted planet carrier, a stationary member, a shiftable control member splined to the carrier, spring means urging said control member into position locking said ring gear and said carrier together, servo mechanism operable to move said control member out of locking relation and into engagement with said stationary member, spring means normally deenergizing said servo mechanism, and fluid actuated pistons operable to energize said servo mechanism.

6. Drive mechanism comprising a power drive shaft, a driven shaft, planetary gearing drivingly connecting said shafts including a ring gear fixed to rotate with the driven shaft and a freely mounted planet carrier, a stationary member, a shiftable control member splined to the carrier, spring means urging said control member into position locking said ring gear and said carrier together, servo mechanism operable to move said control member out of locking relation and into engagement with said stationary member, said servo mechanism including a ring member, an axially movable non-rotatable brake member for holding said ring member, a spring normally disengaging said brake member from said ring member, and fluid actuated pistons operable to engage said brake member with said ring member.

7. Drive mechanism comprising a power drive shaft, a driven shaft, planetary gearing drivingly connected to said shafts and including a planet carrier having a sleeve rotatably mounted on said drive shaft and a ring gear fixed to rotate with the driven shaft, a stationary member, control means extending between said ring gear and said stationary member, said control means including a member having a flanged sleeve slidably splined on said carrier sleeve, a plurality of coiled springs extending between said carrier and the flanged portion of the control sleeve to normally engage the control means with the ring gear to lock the planetary gearing together, and means operable to engage said control means with said stationary member whereby the planetary gearing will reverse the drive from the drive shaft to the driven shaft.

8. Drive mechanism comprising a casing, a power drive shaft projecting into the casing, a driven shaft projecting into the casing, planetary gearing in the casing drivingly connecting said shafts and including a ring gear fixed to rotate with the driven shaft and a freely mounted planet pinion carrier, a brake surface on the interior of the casing, a member slidably splined to the planet carrier and operable to lock the carrier to the ring gear or to the brake surface on the casing, a spring exerting pressure to normally engage the shiftable member with the ring gear, servo mechanism operable to engage said shiftable member with the brake surface on the casing including a rotatably mounted ring member, a shiftable brake member splined to the casing, means normally disengaging said brake member from said servo ring member, and fluid pressure actuated means operable to engage said brake member with said servo ring member.

9. Drive mechanism comprising a casing, a power drive shaft extending into the casing, a driven shaft extending into the casing, planetary gearing in the casing drivingly connecting said shafts, and including a ring gear fixed to rotate with the driven shaft and a planet pinion carrier rotatably mounted on said drive shaft, a brake surface on the interior of the casing, a member shiftably splined to said planet carrier for locking said carrier to said ring gear or with the brake surface on said casing, a spring exerting pressure that normally engages said member with the ring gear, a servo ring adjacent the shiftable member, the adjacent surface of said member and said ring having registering conical recesses therein, balls in the recesses, a brake member adjacent the servo ring and slidably splined to the casing, power cylinders in the casing, pistons in the cylinders adapted to urge said brake member into engagement with said servo ring, spring means between the casing and brake member normally urging the brake member out of engagement with the servo ring, and a fluid pressure system connected with the cylinders.

10. Drive mechanism comprising a casing, a power drive shaft extending into the casing, a driven shaft extending into the casing, planetary gearing drivingly connecting said shafts and including a ring gear fixed to rotate with the driven shaft and a planet pinion carrier rotatably mounted on said drive shaft, a member shiftably splined on said carrier and engageable with said ring gear or with the casing, spring means acting to normally engage the shiftable member with the ring gear, a servo ring aligned with the shiftable member, the adjacent surfaces of said member and said servo ring having registering conical depressions therein, servo balls seated in the registering conical depressions, a ball thrust bearing between the servo ring and the casing, a brake member for holding or releasing said servo ring, and means for operating said brake member.

WALTER R. GRISWOLD.